United States Patent
Yamamoto et al.

(10) Patent No.: US 8,781,665 B2
(45) Date of Patent: Jul. 15, 2014

(54) CONTROL DEVICE FOR HYBRID VEHICLE, AND HYBRID VEHICLE INCORPORATING CONTROL DEVICE

(75) Inventors: Masaya Yamamoto, Kasugai (JP); Hiroki Endo, Nisshin (JP); Masaru Tsukayama, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 60 days.

(21) Appl. No.: 13/639,485

(22) PCT Filed: Apr. 7, 2010

(86) PCT No.: PCT/JP2010/056300
§ 371 (c)(1),
(2), (4) Date: Oct. 4, 2012

(87) PCT Pub. No.: WO2011/125187
PCT Pub. Date: Oct. 13, 2011

(65) Prior Publication Data
US 2013/0030633 A1  Jan. 31, 2013

(51) Int. Cl.
*B60L 9/00* (2006.01)
(52) U.S. Cl.
USPC ........... 701/22; 180/65.23; 903/930; 318/432
(58) Field of Classification Search
USPC ............. 701/22; 180/65.23, 65.265; 903/930; 318/432
See application file for complete search history.

(56) References Cited

U.S. PATENT DOCUMENTS

| | | | | |
|---|---|---|---|---|
| 5,661,380 | A  * | 8/1997 | Obara et al. | 318/139 |
| 7,586,278 | B2 * | 9/2009 | Egami et al. | 318/432 |
| 7,653,466 | B2 * | 1/2010 | Egami et al. | 701/22 |
| 8,103,406 | B2 * | 1/2012 | Aoki et al. | 701/36 |
| 2007/0145927 | A1* | 6/2007 | Egami et al. | 318/432 |
| 2009/0279337 | A1* | 11/2009 | Hamatani | 363/132 |
| 2010/0052588 | A1* | 3/2010 | Okamura et al. | 318/434 |
| 2010/0193267 | A1* | 8/2010 | Nozawa | 180/65.1 |
| 2010/0305796 | A1* | 12/2010 | Aoki et al. | 701/22 |
| 2011/0093151 | A1* | 4/2011 | Kojima et al. | 701/22 |

FOREIGN PATENT DOCUMENTS

| | | | |
|---|---|---|---|
| JP | 2007-062640 A | 3/2007 |
| JP | 2007-159214 A | 6/2007 |
| JP | 2008-301598 A | 12/2008 |
| JP | 2009-131079 A | 6/2009 |
| JP | 2009-280170 A | 12/2009 |

OTHER PUBLICATIONS

International Search Report mailed May 18, 2010 of PCT/JP2010/056300.

* cited by examiner

*Primary Examiner* — Helal A Algahaim
*Assistant Examiner* — Shardul Patel
(74) *Attorney, Agent, or Firm* — Kenyon & Kenyon LLP

(57) ABSTRACT

An ECU uses a map or the like prepared in advance to calculate a discharge allowable power. Then, the ECU sets a VH upper limit value at the first upper limit value. When the running mode is not at a CD mode (that is, at a CS mode), or when the engine is operating, the ECU proceeds to S60. In contrast, when the running mode is at the CD mode and the engine is stopped, the ECU increases the discharge allowable power, and modifies the VH upper limit value to a second upper limit value that is lower than the first upper limit value.

6 Claims, 8 Drawing Sheets

FIG.4
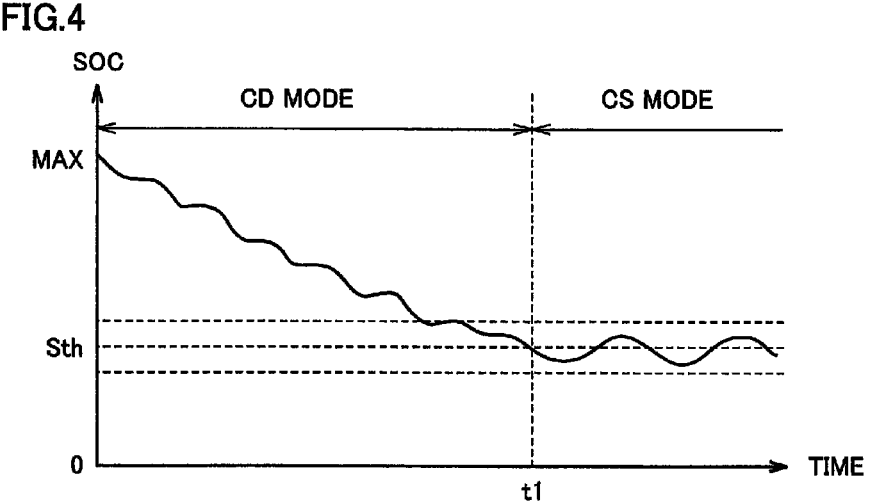
FIG.5
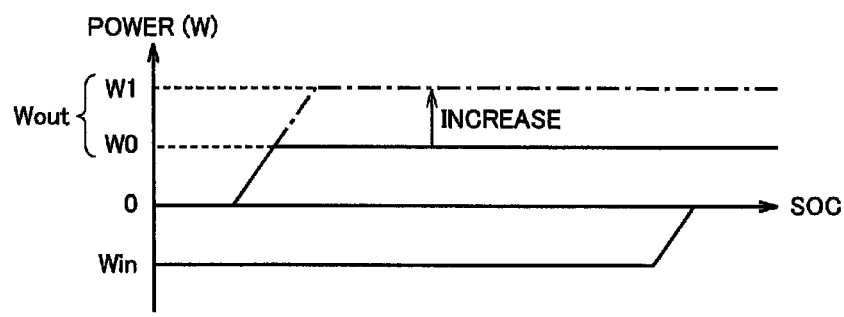
FIG.6
|  | CD MODE | CS MODE |
|---|---|---|
| ENGINE CURRENTLY STOPPED | INCREASE | NON-INCREASE |
| ENGINE CURRENTLY OPERATING | NON-INCREASE | NON-INCREASE |
FIG.7
|  | CD MODE | CS MODE |
|---|---|---|
| ENGINE CURRENTLY STOPPED | V2(<V1) | V1 |
| ENGINE CURRENTLY OPERATING | V1 | V1 |

CONTROL DEVICE FOR HYBRID VEHICLE, AND HYBRID VEHICLE INCORPORATING CONTROL DEVICE

This is a 371 national phase application of PCT/JP2010/056300 filed 7 Apr. 2010, the contents of which are incorporated herein by reference.

TECHNICAL FIELD

The present invention relates to a control device for a hybrid vehicle, and a hybrid vehicle incorporating the control device. Particularly, the present invention relates to a control device for a hybrid vehicle incorporating an internal combustion engine and an electric motor as the power source, and a hybrid vehicle incorporating the control device.

BACKGROUND ART

Hybrid vehicles are attracting attention as environment-friendly vehicles. A hybrid vehicle incorporates a power storage device, an inverter, and an electric motor driven by the inverter, in addition to a conventional internal combustion engine, as the power source for traction.

Japanese Patent Laying-Open No. 2007-62640 (PTL 1) discloses such a hybrid vehicle having the vehicle running mode switched based on the SOC (State of Charge) of a power storage device. The driver of the hybrid vehicle sets the target SOC taking into account the power usage state at the destination. The period starting from running in which the SOC of the power storage device was at a fully charged state and before the SOC reaches the target SOC is referred to as a running mode in which the engine is stopped and running using the motor generator alone is given priority (hereinafter, referred to as "CD (Charge Depleting) mode". When the SOC reaches the target SOC, the vehicle moves to a running mode in which the engine is operated and the SOC is regulated at the target SOC (hereinafter, referred to as "CS (Charge Sustaining) mode" (refer to PTL 1).

CITATION LIST

Patent Literature

PTL 1: Japanese Patent Laying-Open No. 2007-62640
PTL 2: Japanese Patent Laying-Open No. 2008-301598

SUMMARY OF INVENTION

Technical Problem

There is a demand for a hybrid vehicle to run in a state where the internal combustion engine is stopped as much as possible. Recently, attention is focused on the so-called plug-in hybrid vehicle that allows a vehicle-mounted power storage device to be charged from a power supply external to the vehicle. The aforementioned demand is particularly immense in such plug-in hybrid vehicles. (Hereinafter, a vehicle running using the electric motor alone with the internal combustion engine stopped is referred to as "EV (Electric Vehicle) running", whereas a vehicle running with the internal combustion engine operated is referred to as "HV (Hybrid Vehicle) running)".

The more EV running, the greater heat load on electrical components. Particularly in the case where a voltage converter (for example, a boost converter) is provided between a driving device that drives the electric motor (for example, an inverter) and a power storage device, the power semiconductor element constituting the voltage converter is subjected to great heat load in accordance with the increase of EV running.

Although the aforementioned Japanese Patent Laying-Open No. 2007-62640 discloses switching of the vehicle running mode based on the SOC of the power storage device, it is silent about the aforementioned problem and measures thereof in accordance with the increase in EV running.

In view of the foregoing, an object of the present invention is to allow EV running to be extended while suppressing increase of heat load on electrical components in a hybrid vehicle.

Solution to Problem

According to the present invention, a control device for a hybrid vehicle includes a running mode control unit, and a voltage upper limit control unit. The hybrid vehicle includes an internal combustion engine and an electric motor generating driving force of the vehicle, a power storage device capable of being charged and discharged, a driving device driving the electric motor, and a voltage converter provided between the driving device and the power storage device. The voltage converter is configured to allow boosting of input voltage of the driving device to a level higher than the voltage of the power storage device. The running mode control unit controls switching of a running mode including a first mode in which the internal combustion engine is stopped and running using the electric motor alone is given priority (CD mode), and a second mode in which the internal combustion engine is operated and a state of charge (SOC) representing a charging state of the power storage device is maintained at a predetermined target (CS mode). The voltage upper limit control unit modifies a voltage upper limit value indicating the upper limit of voltage boosted by the voltage converter based on the running mode and operation/stop of the internal combustion engine.

Preferably, the voltage upper limit control unit takes a first upper limit value as the voltage upper limit value when the running mode is at the first mode and the internal combustion engine is operating, or when the running mode is at the second mode, and takes a second upper limit value lower than the first upper limit value as the voltage upper limit value when the running mode is at the first mode and the internal combustion engine is stopped.

Further preferably, the control device for a hybrid vehicle further includes a discharge allowable power control unit. When the running mode is at the first mode and the internal combustion engine is stopped, the discharge allowable power control unit increases the discharge allowable power (Wout) indicating the electric power that can be discharged by the power storage device than when the running mode is at the first mode and the internal combustion engine is operating or than when the running mode is at the second mode.

Further preferably, the hybrid vehicle includes a charging device configured to receive supply of electric power from a power supply external to the vehicle and charge the power storage device. The running mode control unit sets the running mode at the first mode following charging of the power storage device by the charging device.

Preferably, the control device for a hybrid vehicle further includes a torque requirement calculation unit and a determination unit. The torque requirement calculation unit calculates a torque upper limit indicating the upper limit value of the torque output from the electric motor. The determination unit determines starting of the internal combustion engine based on a comparison result between required torque of the hybrid vehicle and the torque upper limit value. When the voltage upper limit value is the second upper limit value, the torque requirement calculation unit takes, as the torque upper limit value, a smaller of torque that is a subtraction of reaction force generated at the motor generator when the internal combustion engine is started from torque of the electric motor when the voltage boosted by the voltage converter is taken as the first upper limit value, and the torque of the electric motor when the voltage boosted by the voltage converter is taken as the second upper limit value.

According to the present invention, the hybrid vehicle includes any of the control device set forth above.

Advantageous Effects of Invention

In the present invention, the voltage upper limit value indicating the upper limit of the voltage boosted by the voltage converter is modified based on the running mode and operation/stop of the internal combustion engine. Accordingly, when the discharge allowable power (Wout) of the power storage device is increased in the case where the running mode is at the first mode (CD mode) and the internal combustion engine is stopped for the purpose of extending EV running, the heat load on the voltage converter is alleviated by lowering the voltage upper limit value.

Thus, according to the present invention, the EV running can be extended, and increase in the heat load on electrical components can be suppressed.

BRIEF DESCRIPTION OF DRAWINGS

FIG. 4 represents the relationship between the change in SOC of the power storage device and the running mode.

FIG. 5 represents the discharge allowable power of the power storage device.

FIG. 6 is a diagram to describe increase/non-increase of discharge allowable power according to the running mode and operation/stop of the engine.

FIG. 7 is a diagram to describe modification of the VH upper limit value according to the running mode and operation/stop of the engine.

DESCRIPTION OF EMBODIMENTS

Figure 1:
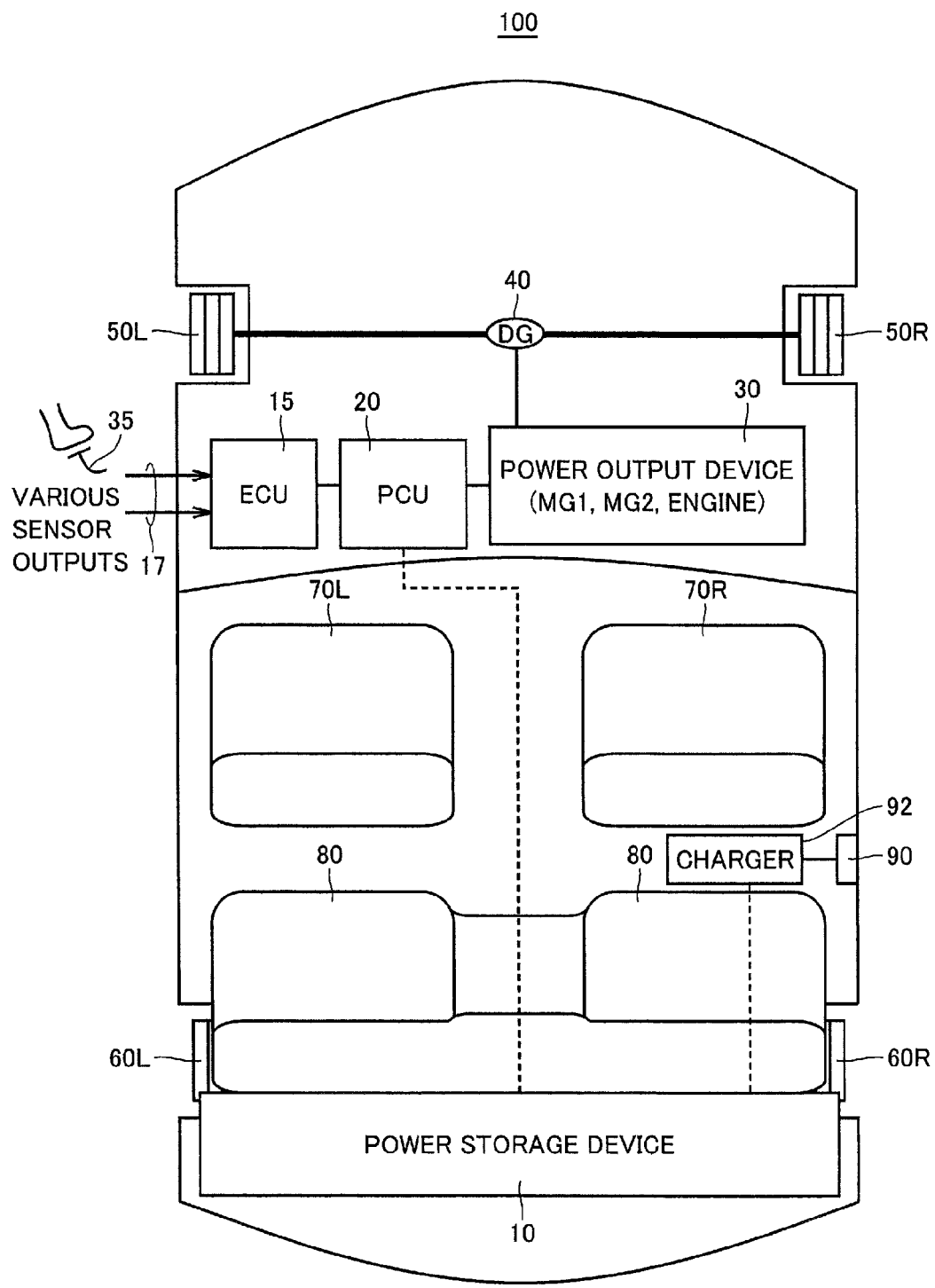
FIG. 1 is a block diagram representing an entire configuration of a hybrid vehicle to which a control device according to a first embodiment of the present invention is applied.

Embodiments of the present invention will be described in detail hereinafter with reference to the drawings. In the drawings, the same or corresponding elements have the same reference characters allotted, and description thereof will not be repeated.

First Embodiment

FIG. 1 is a block diagram representing an entire configuration of a hybrid vehicle to which a control device according to a first embodiment of the present invention is applied. Referring to FIG. 1, a hybrid vehicle 100 includes a power storage device 10, an ECU (Electronic Control Unit) 15, a PCU (Power Control Unit) 20, a power output device 30, and a differential gear (hereinafter, also referred to as DG) 40. Hybrid vehicle 100 further includes front wheel 50L and 50R, rear wheels 60L and 60R, front seats 70L and 70R, a rear seat 80, a charging inlet 90, and a charger 92.

Power storage device 10 is a rechargeable DC power source, formed of a secondary battery such as nickel-metal hydride or lithium ion. Power storage device 10 is disposed at a rear side region of rear seat 80 for example, and electrically connected with PCU 20 to supply DC voltage thereto. Power storage device 10 receives electric power generated by power output device 30 from PCU 20 to be charged. Power storage device 10 is also charged by a charger 92 connected to a charging inlet 90 and receiving electric power supplied from a power supply external to the vehicle. Hereinafter, the power supply external to the vehicle is referred to as "external power supply", and the charging of power storage device 10 by the external power supply is referred to as "external charging".

PCU 20 generically shows a power converter required in hybrid vehicle 100. PCU 20 includes a converter boosting the voltage supplied from power storage device 10, an inverter driving a motor generator included in power output device 30, and the like.

ECU 15 receives various sensor outputs 17 from various types of sensors indicating the driving state and vehicle state. Various sensor outputs 17 include the accelerator pedal position corresponding to the stepping amount on an accelerator pedal 35, the vehicle speed according to the rotational speed of the wheels, and the like. ECU 15 executes various control related to hybrid vehicle 100 based on such sensor outputs applied.

Power output device 30 is provided as the driving source of the wheels, and includes motor generators MG1 and MG2 and an engine. These components are mechanically coupled via a power split device (not shown). In accordance with the running state of hybrid vehicle 100, distribution and coupling of the driving force are implemented among the aforementioned three components via the power split device. As a result, front wheels 50L and 50R are driven. DG 40 transmits the motive power output from power output device 30 to front wheels 50L and 50R, and transmits the rotational force from front wheels 50L and 50R to power output device 30. Accordingly, power output device 30 transmits the motive power from the engine and motor generator to front wheels 50L and 50R via DG 40 to drive front wheels 50L and 50R. Power output device 30 receives the rotational force of the motor generator by front wheels 50L and 50R to generate power and provide the generated power to PCU 20.

Motor generators MG1 and MG2 may function as a power generator and an electric motor. Motor generator MG1 operates mainly as a power generator, and motor generator MG2 operates mainly as an electric motor. Specifically, motor generator MG1 receives some of the output from the engine distributed by the power split device for generating power. Motor generator MG1 receives supply of electric power from power storage device 10 to operate as an electric motor for cranking up and starting the engine.

Motor generator MG2 is driven by at least one of the electric power stored at power storage device 10 and the electric power generated by motor generator MG1. The driving force of motor generator MG2 is transmitted to the driving shaft of front wheels 50L and 50R via DG 40. Accordingly, motor generator MG2 assists the engine for driving the vehicle, or for driving the vehicle by its own driving force alone. In a vehicle braking mode, motor generator MG2 is driven by front wheels 50L and 50R to operate as a power generator. At this stage, the electric power generated by motor generator MG2 charges power storage device 10 via PCU 20.

PCU 20 responds to a control instruction from ECU 15 to boost the DC voltage received from power storage device 10, and convert the boosted DC voltage into AC voltage to drive motor generators MG1 and MG2 in power output device 30. In a regenerative operation mode of motor generators MG1 and MG2, PCU 20 responds to a control instruction from ECU 15 to convert the AC voltage generated by motor generators MG1 and MG2 into DC voltage for charging power storage device 10.

Charging inlet 90 is configured to allow connection with the connector of a charging cable (not shown) connected to an external power supply. At the time of external charging, electric power is received from an external power supply connected to charging inlet 90. The received electric power is supplied to charger 92. Charger 92 located between charging inlet 90 and power storage device 10 converts the electric power supplied from the external power supply connected to charging inlet 90 to the level of the voltage of power storage device 10 for output thereto.

Figure 2:
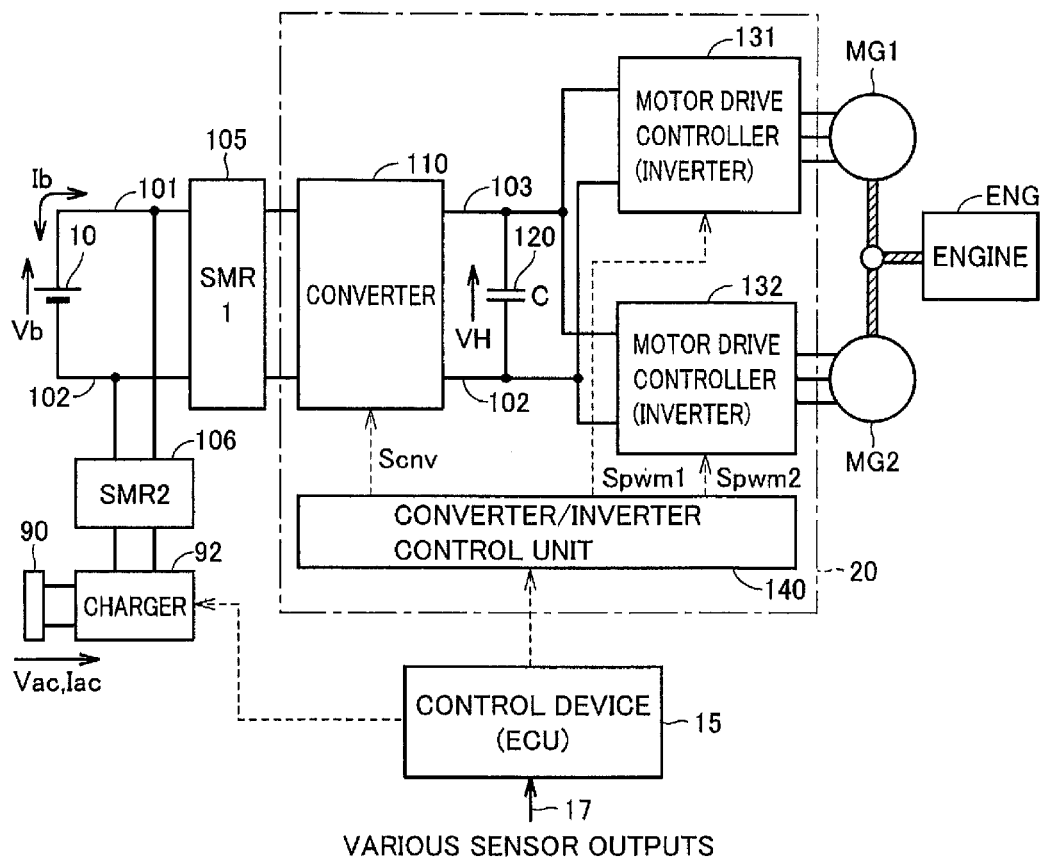
FIG. 2 is a block diagram representing a configuration of an electric system of the hybrid vehicle of FIG. 1.

FIG. 2 is a block diagram representing a configuration of the electric system of hybrid vehicle 100 shown in FIG. 1. Referring to FIG. 2, the electric system includes power storage device 10, SMRs (System Main Relay) 105 and 106, PCU 20, motor generators MG1 and MG2, ECU 15, charging inlet 90, and charger 92.

Motor generators MG1 and MG2 are connected to an engine ENG and driving wheels not shown (front wheels 50L and 50R of FIG. 1) via the power split device. Hybrid vehicle 100 can run using engine ENG and motor generator MG2. Motor generator MG1 starts engine ENG and generates electric power using the driving force of engine ENG.

SMR 105 is provided between power storage device 10 and PCU 20, and is set on in response to a command from ECU 15 in the event of a vehicle running. SMR 106 is provided between power storage device 10 and charger 92, and is set on according to a command from ECU 15 in the event of an external charging.

PCU 20 includes a converter 110, a capacitor 120, motor drive controllers 131 and 132, and a converter/inverter control unit 140. In the first embodiment, motor generators MG1 and MG are AC motors, and motor drive controllers 131 and 132 are formed of inverters. Hereinafter, motor drive controller 131 (132) is also referred to as "inverter 131 (132)".

Converter 110 boosts a voltage VH between a positive line 103 and a negative line 102 (hereinafter, also referred to as "system voltage VH") to a level greater than or equal to voltage Vb of power storage device 10 based on control signal Scnv from converter/inverter control unit 140. Converter 110 is constituted of a current invertible type boost chopper circuit.

Inverters 131 and 132 are provided corresponding to motor generators MG1 and MG2, respectively. Inverters 131 and 132 are connected to converter 110 parallel to each other for driving motor generators MG1 and MG2 based on control signals Spwm1 and Spwm2, respectively, from converter/inverter control unit 140.

Converter/inverter control unit 140 generates control signals Scnv, Spwm1 and Spwm2 for driving converter 110, motor generator MG1 and motor generator MG2, respectively, based on control command values received from ECU 15 (the target value of voltage VH, the torque target value of motor generators MG1, MG2, and the like). Converter/inverter control unit 140 outputs the generated control signals Scnv, Spwm1 and Spwm2 to converter 110, inverter 131, and inverter 132, respectively.

According to various sensor outputs 17, ECU 15 carries out various control such as controlling the running mode of hybrid vehicle 100, engine ENG start/stop determination, charging and discharging control of power storage device 10, upper limit control of system voltage VH and the like. ECU 15 generates a control command value to drive PCU 20, and provides the generated control command value to converter/inverter control unit 140 of PCU 20. ECU 15 generates and provides to charger 92 a signal for driving charger 92.

Figure 3:
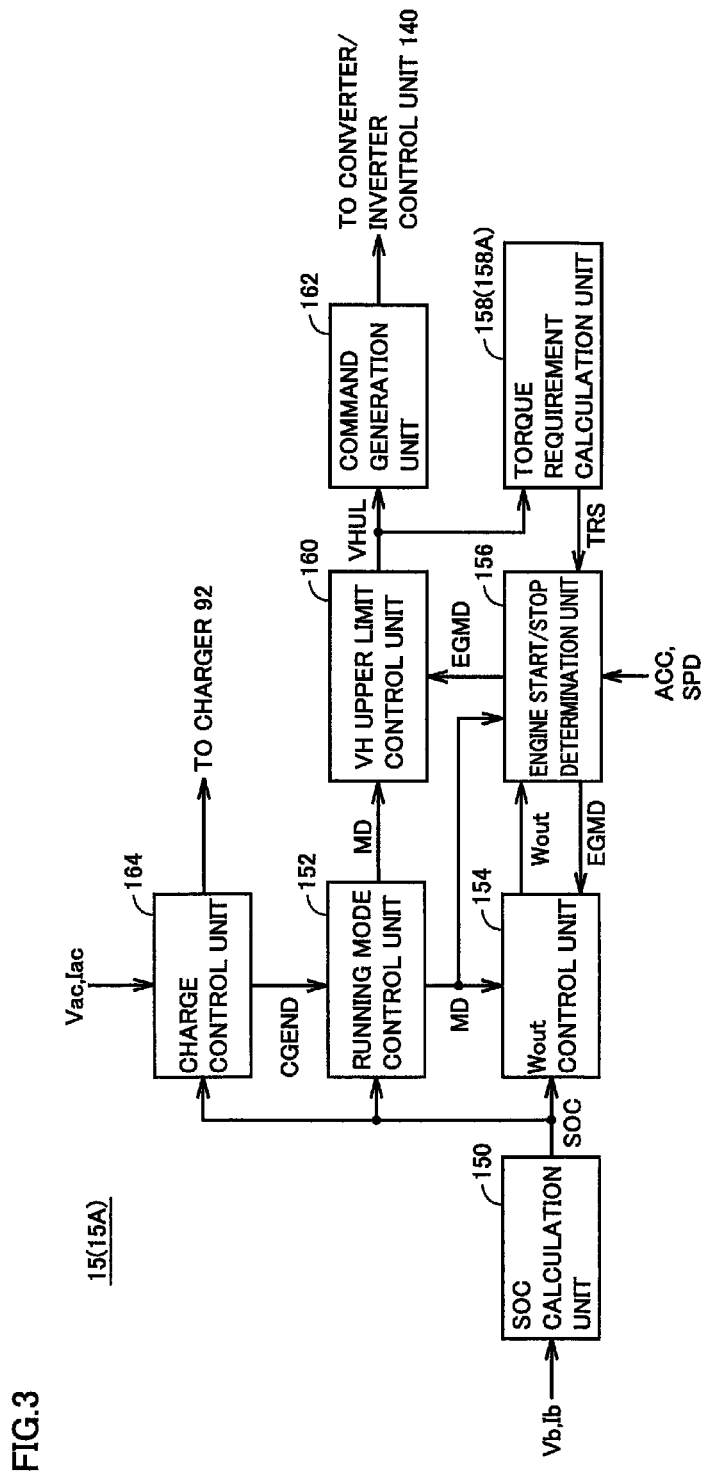
FIG. 3 is a functional block diagram of the ECU in FIG. 2.

FIG. 3 is a functional block diagram of ECU 15 in FIG. 2. Referring to FIG. 3, ECU 15 includes an SOC calculation unit 150, a running mode control unit 152, a Wout control unit 154, an engine start/stop determination unit 156, and a torque requirement calculation unit 158. ECU 15 further includes a VH upper limit control unit 160, a command generation unit 162, and a charge control unit 164.

SOC calculation unit 150 calculates the SOC indicating the charging state of power storage device 10 based on voltage Vb and current Ib of power storage device 10 detected by a sensor not shown. The SOC represents in 0-100% the stored amount relative to a fully charged state of power storage device 10, and indicates the remaining stored amount in power storage device 10. For the method of calculating this SOC, various well-known methods can be employed.

Running mode control unit 152 controls the switching of the vehicle running mode based on the SOC calculated by SOC calculation unit 150. Specifically, running mode control unit 152 controls the switching to a CD mode in which engine ENG is stopped and running using motor generator MG2 alone is given priority, or a CS mode in which engine ENG is operated and the SOC of power storage device 10 is maintained at a predetermined target.

Even in the CD mode, the operation of engine ENG is allowed such as when the accelerator pedal is stepped on greatly by the driver, when an engine driving type air conditioner is operated, when in an engine warm-up state, or the like. The CD mode corresponds to a running mode in which the electric power stored in the power storage device 10 is basically used as the energy source for running the vehicle without maintaining the SOC of power storage device 10. During the CD mode, the ratio of discharging is eventually relatively greater than charging. In contrast, the CS mode is a running mode in which engine ENG is operated as necessary and power is generated by motor generator MG1 for maintaining the SOC of power storage device 10 at a predetermined target level, and is not limited to running with engine ENG always operated.

In other words, even if the running mode is at the CD mode, engine ENG will be operated if the accelerator pedal is stepped on greatly and large vehicle power is required. Furthermore, even if the running mode is at the CS mode, engine ENG will stop when the SOC exceeds the target value. Thus, irrespective of these running modes, running with engine ENG stopped and using motor generator MG2 alone is referred to as "EV running", whereas running with engine ENG operated and using motor generator MG2 and engine ENG is referred to as "HV running".

FIG. 4 represents the relationship between the change in the SOC of power storage device 10 and the running mode. Referring to FIG. 4, it is assumed that running is started after power storage device 10 attains a fully charged state (SOC=MAX) by external charging. Following external charging, the running mode is set at the CD mode. During running in a CD mode, the SOC generally decreases in accordance with increase of the running distance although the SOC may temporarily be increased by the regenerative electric power generated at the time of speed reduction or the like. When the SOC attains a threshold value Sth at time t1, the running mode is switched to the CS mode, and the SOC is regulated at the vicinity of threshold value Sth.

Referring to FIG. 3 again, running mode control unit 152 sets the running mode at the CD mode upon receiving a charging end signal CGEND indicating the termination of external charging from charge control unit 164. Then, running mode control unit 152 outputs a mode signal MD indicating whether the running mode is at the CD mode or CS mode to Wout control unit 154, engine start/stop determination unit 156, and VH upper limit control unit 160.

Wout control unit 154 receives the SOC of power storage device 10 from SOC calculation unit 150 and mode signal MD indicating the running mode from running mode control unit 152. Wout control unit 154 receives an engine mode signal EGMD indicating whether engine ENG is operated or stopped from engine start/stop determination unit 156. Based on these signals, Wout control unit 154 calculates discharge allowable power Wout indicating the electric power (W) that can be discharged from power storage device 10.

FIG. 5 represents discharge allowable power Wout of power storage device 10. Referring to FIG. 5, discharge allowable power Wout represents the maximum level of the electric power (W) that can be output from power storage device 10. When the SOC of power storage device 10 decreases, discharge allowable power Wout is controlled to prevent overdischarging.

In the first embodiment, discharge allowable power Wout is modified based on the vehicle running mode and engine ENG operation/stop state, as will be described afterwards. Specifically, when the running mode is at the CD mode and engine ENG is operated, or when the running mode is at the CS mode, discharge allowable power Wout is set at the default value of W0. When the running mode is at the CD mode and engine ENG is stopped, discharge allowable power Wout is increased from W0 to a predetermined W1.

Charging allowable power Win is the maximum value of electric power (W) that can be input to power storage device 10. Charging allowable electric power Win is restricted when the SOC of power storage device 10 becomes high to prevent overcharging.

Referring to FIG. 3 again; Wout control unit 154 calculates discharge allowable power Wout (default value W0) based on the SOC of power storage device 10, the temperature, and the like using a map prepared in advance. Wout control unit 154 modifies discharge allowable power Wout based on the running mode indicated by mode signal MD received from running mode control unit 152 and engine ENG operation/stop indicated by engine mode signal EGMD signal from engine start/stop determination unit 156.

As shown in FIG. 6, when the running mode is at the CD mode and engine ENG is stopped, Wout control unit 154 increases discharge allowable power Wout from W0 to predetermined W1 (FIG. 5). In contrast, when the running mode is at the CD mode and engine ENG is operated, or when the running mode is at the CS mode, Wout control unit 154 does not increase discharge allowable power Wout.

The reason why discharge allowable power Wout is increased when the running mode is at the CD mode and engine ENG is stopped is to minimize the starting frequency of engine ENG to extend EV running. In other words, when the accelerator pedal is stepped on and the vehicle required power exceeds discharge allowable power Wout even if the running mode is at the CD mode, engine ENG is started and the vehicle is switched from EV running to HV running to satisfy the required power.

However, the driver cannot enjoy the sense of EV running sufficiently if engine ENG is frequently started in response to stepping on the accelerator pedal. The first embodiment is directed to improving the sense of EV running by increasing discharge allowable power Wout to suppress the frequency of starting engine ENG when the running mode is at the CD mode and engine ENG is stopped.

In the first embodiment, discharge allowable power Wout is not always increased. Discharge allowable power Wout is not increased when the running mode is at the CD mode and engine ENG is operated, or when the running mode is at the CS mode. This is to suppress increase of the heat load on electrical components (mainly converter 110), and to avoid the change in the vehicle acceleration property between applying or not applying the first embodiment when the engine is operated and when running in the CS mode.

Referring to FIG. 3 again, Wout control unit 154 outputs to engine start/stop determination unit 156 discharge allowable power Wout subjected to the modification set forth above based on the running mode and engine ENG operation/stop.

Engine start/stop determination unit 156 receives discharge allowable power Wout from Wout control unit 154. Engine start/stop determination unit 156 receives from torque requirement calculation unit 158 a torque threshold value TRS indicating the upper limit value of the torque output from motor generator MG2. Furthermore, engine start/stop determination unit 156 receives a mode signal MD indicating the running mode from running mode control unit 152. Engine start/stop determination unit 156 carries out a start/stop determination of engine ENG based on the running mode, discharge allowable power Wout and torque threshold value TRS.

Specifically, engine start/stop determination unit 156 calculates the vehicle required power based on accelerator pedal position ACC, vehicle speed SPD, and the like received as various sensor outputs 17 (FIG. 1). Engine start/stop determination unit 156 calculates the maximum power that can be output from motor generator MG2 based on discharge allowable power Wout from Wout control unit 154, and determines whether the calculated maximum power exceeds the vehicle required power (power requirement). Engine start/stop determination unit 156 also calculates the vehicle required torque based on accelerator pedal position ACC, vehicle speed SPD, and the like. Engine start/stop determination unit 156 determines whether the calculated vehicle required torque is greater than torque threshold value TRS received from torque requirement calculation unit 158 (torque requirement).

When any of the power requirement and torque requirement is established, engine start/stop determination unit 156 determines that engine ENG is to be started. When neither the power requirement nor torque requirement is established, engine start/stop determination unit 156 determines that engine ENG is to be stopped.

When the running mode is at the CD mode, engine start/stop determination unit 156 calculates the maximum power that can be output from motor generator MG2 based on the increased discharge allowable power Wout (W1 in FIG. 5). Specifically, although discharge allowable power Wout is non-increased (default value W0) during operation of engine ENG when the running mode is at the CD mode (FIG. 6), as set forth above, increased discharge allowable power Wout (W1) is used for determining whether engine ENG is to be stopped. Accordingly, the stopping of engine ENG is facilitated after engine ENG is started in a CD mode, allowing the sense of EV running to be further improved.

Torque requirement calculation unit 158 receives from VH upper limit control unit 160 (described afterwards) a VH upper limit value VHUL indicating the upper limit value of voltage VH (system voltage VH) boosted by converter 110 (FIG. 2). Torque requirement calculation unit 158 calculates the upper limit value of the torque of motor generator MG2 based on the received VH upper limit value VHUL, and provides the calculated torque upper limit value to engine start/stop determination unit 156 as torque threshold value TRS.

VH upper limit control unit 160 receives mode signal MD and engine mode signal EGMD from running mode control unit 152 and engine start/stop determination unit 156, respectively. VH upper limit control unit 160 modifies VH upper limit value VHUL based on the running mode indicated by mode signal MD and operation/stop of engine ENG state indicated by engine mode signal EGMD.

Specifically, as shown in FIG. 7, when the running mode is at the CD mode and engine ENG is operated, or when the running mode is at the CS mode, VH upper limit control unit 160 takes a predetermined upper limit value V1 as VH upper limit value VHUL. In contrast, when the running mode is at the CD mode and engine ENG is stopped, VH upper limit control unit 160 takes upper limit value V2 that is lower than upper limit value V1 as VH upper limit value VHUL.

The reason why VH upper limit value VHUL is modified from upper limit value V1 to a lower upper limit value V2 when the running mode is at the CD mode and engine ENG stopped is set forth below. In order to improve the sense of EV running by suppressing the frequency of starting engine ENG, discharge allowable power Wout is increased when the running mode is at the CD mode and engine ENG is stopped, as described above. However, the applied current at converter 110 (FIG. 2) will become greater by the increase of discharge allowable power Wout, leading to an increase of the heat load on the power semiconductor element constituting converter 110. The increased discharge allowable power Wout must be restricted if the temperature of the power semiconductor element exceeds the upper limit, leading to degradation in drivability.

The factors affecting the heat load on the power semiconductor element constituting converter 110 includes the current amount, switching frequency (carrier frequency), slip current, system voltage VH, and the like. With regard to system voltage VH, the switching loss of the power semiconductor element is reduced if voltage VH is lowered. As a result, the heat load on the power semiconductor element is decreased. For the purpose of realizing extension of EV running and suppressing increase of the heat load on electrical components in the first embodiment, discharge allowable power Wout is increased and VH upper limit value VHUL is lowered from upper limit value V1 to upper limit value V2, when the running mode is at the CD mode and engine ENG is stopped.

In the first embodiment, VH upper limit value VHUL is not always set at upper limit value V2. When the running mode is at the CD mode and engine ENG is operating, or when the running mode is at the CS mode, upper limit value V1 is taken as VH upper limit value VHUL. This is to prevent reduction in the vehicle driving torque when the driver operates accelerator pedal 35 (FIG. 1) to a wide open throttle position (WOT). This issue will be described briefly hereinafter based on FIGS. 8 and 9.

Figure 8:
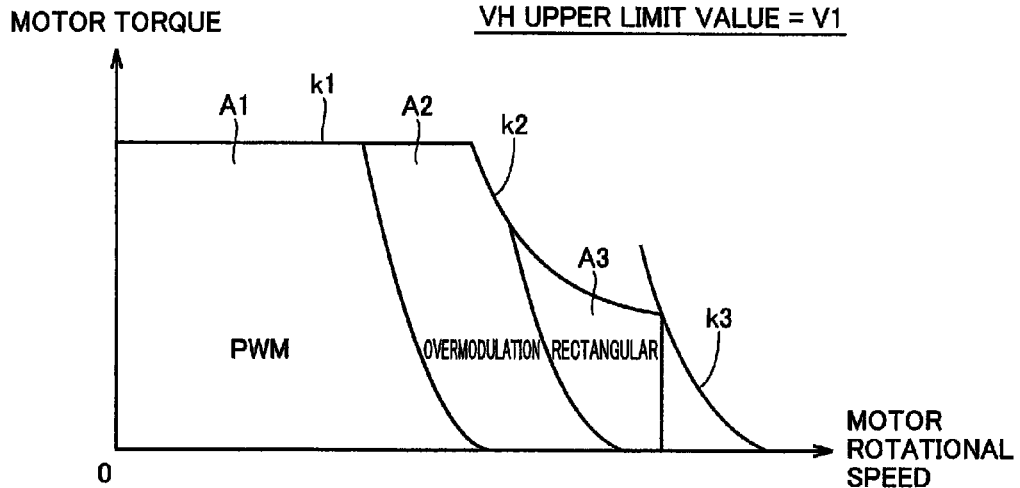
FIG. 8 is a first diagram representing the speed-torque property of a motor generator MG2.
Figure 9:
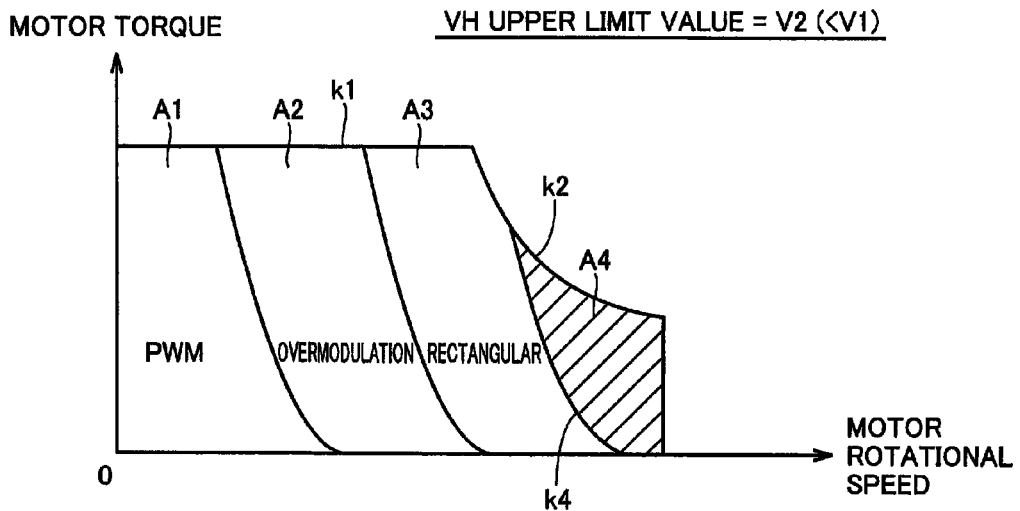
FIG. 9 is a second diagram representing the speed-torque property of motor generator MG2.

FIGS. 8 and 9 represent the speed-torque property of motor generator MG2. Referring to FIG. 8, line k1 represents the constant torque property; line k2 represents the constant output property; and line k3 represents the torque property of motor generator MG2 when system voltage VH is upper limit value V1.

Region A1 represents the region where sine wave PWM (Pulse Width Modulation) control is implemented. Region A2 is where overmodulation PWM control is implemented. Region A3 is where rectangular wave voltage control is implemented. In sine wave PWM control, the modulation factor (the ratio of basic wave component (effective value) of motor applied voltage to voltage VH) can be increased only up to approximately 0.61. In overmodulation PWM control, the modulation factor can be improved from the highest modulation factor in the sine wave PWM control mode to the range of 0.78. In rectangular wave voltage control, the modulation factor is constant at the maximum 0.78.

As shown in FIG. 8, when VH upper limit value VHUL is upper limit value V1, the torque of motor generator MG2 is not restricted by line k3 (indicating torque requirement). The capability of motor generator MG2 can be utilized to the maximum level.

Referring to FIG. 9, line k4 represents the torque property of motor generator MG2 when system voltage VH is upper limit value V2 (<V1). The hatched region A4 is where the torque of motor generator MG2 is restricted due to the modification of VH upper limit value VHUL from upper limit value V1 to upper limit value V2. In other words, when VH upper limit value VHUL is upper limit value V2, the torque indicated at a region A4 exceeding line k4 (torque requirement) cannot be output by motor generator MG2.

Therefore, when VH upper limit value VHUL is always set at upper limit value V2, the vehicle driving torque will be degraded by the restriction of the torque of motor generator MG2 when accelerator pedal 35 is at wide open throttle position WOT. Thus, the first embodiment is directed to maintaining VH upper limit value VHUL at upper limit value V1 when the running mode is at the CD mode and engine ENG is operated, or when the running mode is at the CS mode for the purpose of satisfying the torque performance when accelerator pedal 35 is at wide open throttle position WOT.

Figure 10:
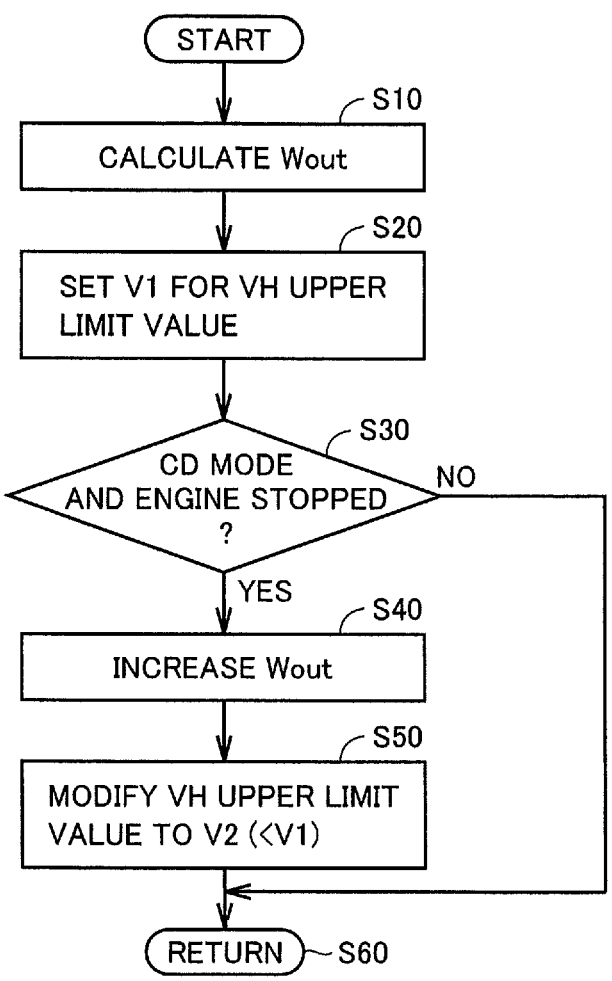
FIG. 10 is a flowchart to describe the procedure associated with setting the VH upper limit value.

FIG. 10 is a flowchart to describe the procedure in setting VH upper limit value VHUL. Referring to FIG. 10, ECU 15 calculates discharge allowable power Wout (default value W0) using a map or the like prepared in advance (step S10). Then, ECU 15 sets VH upper limit value VHUL at a predetermined upper limit value V1 (step S20).

Then, ECU 15 determines whether the running mode is at the CD mode and engine ENG is stopped or not (step S30). When a determination is made that the running mode is not the CD mode (i.e., at the CS mode), or when engine ENG is operating (NO at step S30), ECU 15 proceeds to the process of step S60.

When a determination is made that the running mode is at the CD mode and engine ENG is stopped at S30 (YES at step S30), ECU 15 increases discharge allowable power Wout from W0 to predetermined W1 (step S40), as shown in FIG. 5. ECU 15 further modifies VH upper limit value VHUL to upper limit value V2 that is lower than upper limit value V1 (step S50).

Figure 11:
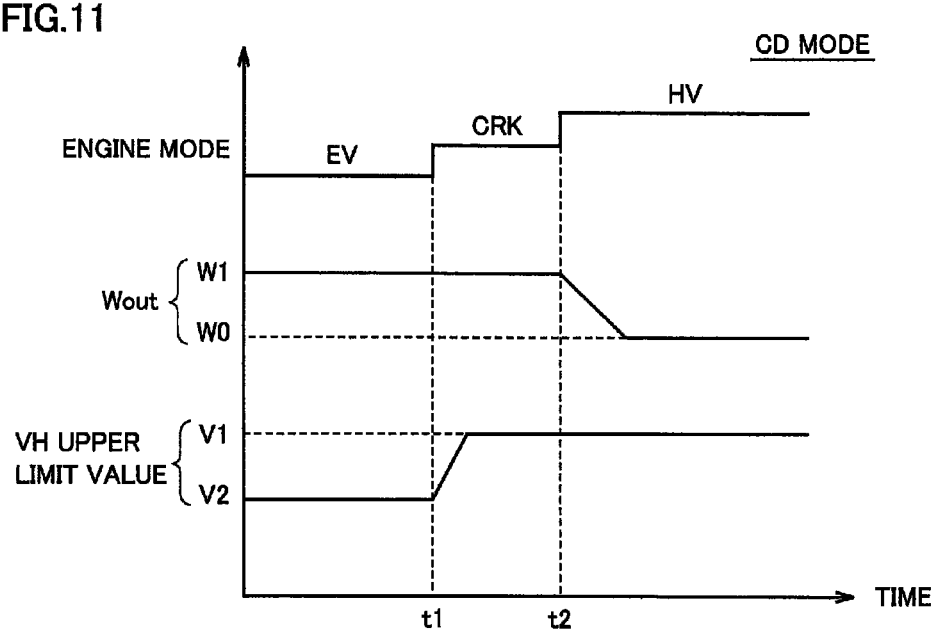
FIG. 11 represents the change in the discharge allowable power and VH upper limit value when the engine is to be started in a CD mode.

FIG. 11 represents the change in discharge allowable power Wout and VH upper limit value VHUL when engine ENG starts in a CD mode. Referring to FIG. 11, "EV" of the engine mode refers to EV running with engine ENG stopped. "CRK" refers to receiving supply of electric power from power storage device 10 for engine ENG to be cranked by motor generator MG1. "HV" refers to HV running with engine ENG operated.

Prior to time t1, engine ENG is stopped (engine mode "EV"); discharge allowable power Wout is increased to W1; and VH upper limit value VHUL is set to upper limit value V2 (<V1). When the vehicle required power exceeds engine start/stop power threshold value at time t1 in response to stepping on the accelerator pedal, engine ENG is cranked up (engine mode "CRK"). In response, VH upper limit value VHUL returns to upper limit value V1. When engine ENG starts (engine mode "HV") at time t2, discharge allowable power Wout returns to the non-increase state of W0 from W1.

Figure 12:
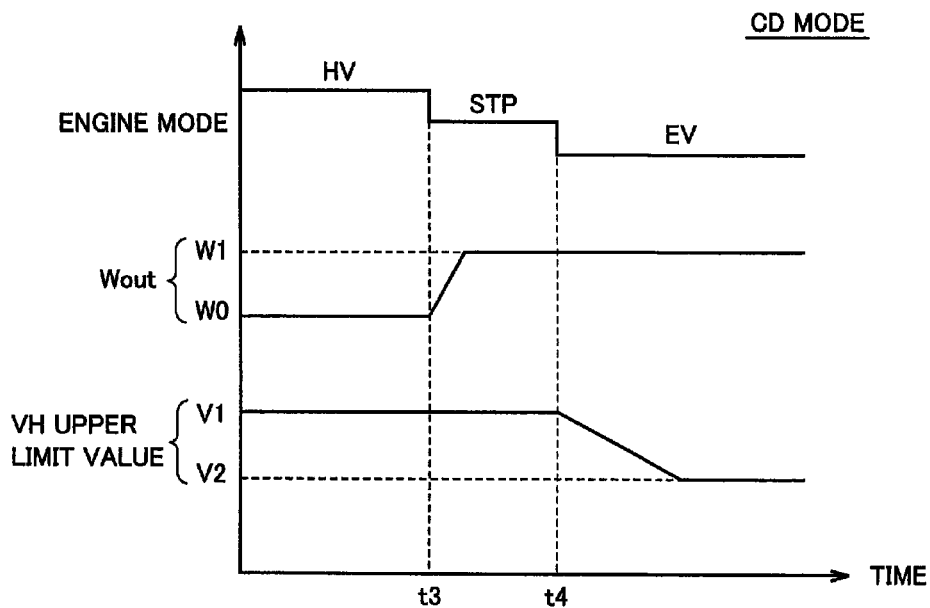
FIG. 12 represents the change in discharge allowable power and VH upper limit value when the engine is to be stopped in a CD mode.

FIG. 12 represents the change in discharge allowable power Wout and VH upper limit value VHUL when engine ENG is stopped in a CD mode. Referring to FIG. 12, engine ENG is operated before time t3 (engine mode "HV"); discharge allowable power Wout is W0 (non-increased); and upper limit value VHUL is upper limit value V1.

At time t3 when the vehicle required power becomes lower than engine start/stop power threshold value (W1), an engine ENG stopping process is executed (engine mode "STP"). In response, discharge allowable power Wout is increased from W0 to W1. When engine ENG stopped at time t4 (engine mode "EV"), VH upper limit value VHUL is modified from upper limit value V1 to V2 (<V1).

Thus, in the first embodiment, VH upper limit value VHUL indicating the upper limit value of voltage VH boosted by converter 110 is modified based on the running mode and engine ENG operation/stop. Accordingly, when discharge allowable power Wout of power storage device 10 is increased in the case where the running mode is at the CD mode and engine ENG is stopped for the purpose of increasing EV running, the heat load on converter 110 is alleviated by lowering VH upper limit value VHUL from upper limit value V1 down to V2. Thus, according to the first embodiment, EV running can be extended, and increase in the heat load on electrical components can be suppressed.

Second Embodiment

In the second embodiment, the torque requirement in determining engine ENG start/stop based on the torque is revised in association with modifying VH upper limit value VHUL from upper limit value V1 to V2 when the running mode is at the CD mode and engine ENG is stopped.

Figure 13:
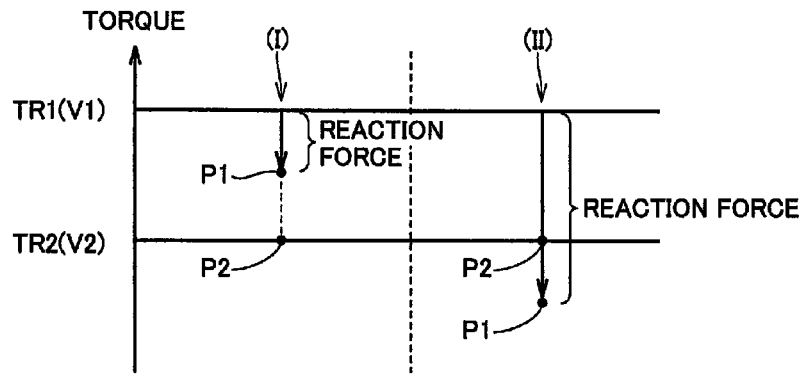
FIG. 13 is a diagram to describe torque requirement for determining start/stopped of the engine based on the torque.

FIG. 13 is a diagram to describe the torque requirement for determining engine ENG start/stop based on the torque. Referring to FIG. 13, torque TR1 represents the maximum torque that can be output by motor generator MG2 when system voltage VH is upper limit value V1. Torque TR2 represents the maximum torque that can be output by motor generator MG2 when system voltage VH is upper limit value V2 (<V1). "Reaction force" in the drawing represents the reaction force (torque) received by motor generator MG2 via the power split device when engine ENG is cranked up by motor generator MG1 at the time of starting engine ENG. Engine ENG must be started when the vehicle required torque exceeds a value that is a subtraction of the reaction force received at motor generator MG2 at the time of starting engine ENG from maximum torque TR1 that can be output from motor generator MG2 in consideration of the reaction force.

Case (I) in FIG. 13 corresponds to the case where the value of torque TR1 minus the reaction force (point P1) is larger than torque TR2 (point P2). When the torque requirement is set at point P1 in this case (that is, engine ENG is started when the vehicle required torque exceeds point P1), the torque of motor generator MG2 will be restricted at TR2 by system voltage VH that is restricted at upper limit value V2. Therefore, when the vehicle required torque is in the range from P2 to point P1, an insufficient torque state occurs. Case (II) corresponds to the case where the value of torque TR1 minus the reaction force (point P1) is larger than torque TR2 (point P2). In this case, the torque will not be insufficient even if the torque requirement is at point P1.

In the second embodiment, the smaller of the value of torque TR1 minus the reaction force at the time of starting the engine and torque TR2 is taken as the torque requirement when VH upper limit value VHUL is upper limit value V2, and a determination of starting engine ENG is made based on the comparison result between the vehicle required torque and the torque requirement. Accordingly, the occurrence of insufficient torque can be prevented, and the reaction force at the time of starting the engine does not have to be taken into account when torque TR2 is employed as the torque requirement. Accordingly, EV running is increased.

Referring to FIG. 3 again, ECU 15A of the second embodiment includes, based on the configuration of ECU 15 in the first embodiment, a torque requirement calculation unit 158A, instead of torque requirement calculation unit 158. When system voltage VH is upper limit value V2, torque requirement calculation unit 158A outputs the smaller of the torque that is a subtraction of the reaction force generated at motor generator MG2 at the time of starting engine ENG from the torque (TR1) of motor generator MG2 when system voltage VH is upper limit value V1, and the torque (TR2) of motor generator MG2 when system voltage VH is upper limit value V2 to engine start/stop determination unit 156 as torque threshold value TRS for starting the engine.

Torque requirement calculation unit 158A outputs a value that is a subtraction of predetermined hysteresis-corresponding torque α from the torque threshold value for starting the engine to engine start/stop determination unit 156 as torque threshold value TRS for stopping the engine.

Figure 14:
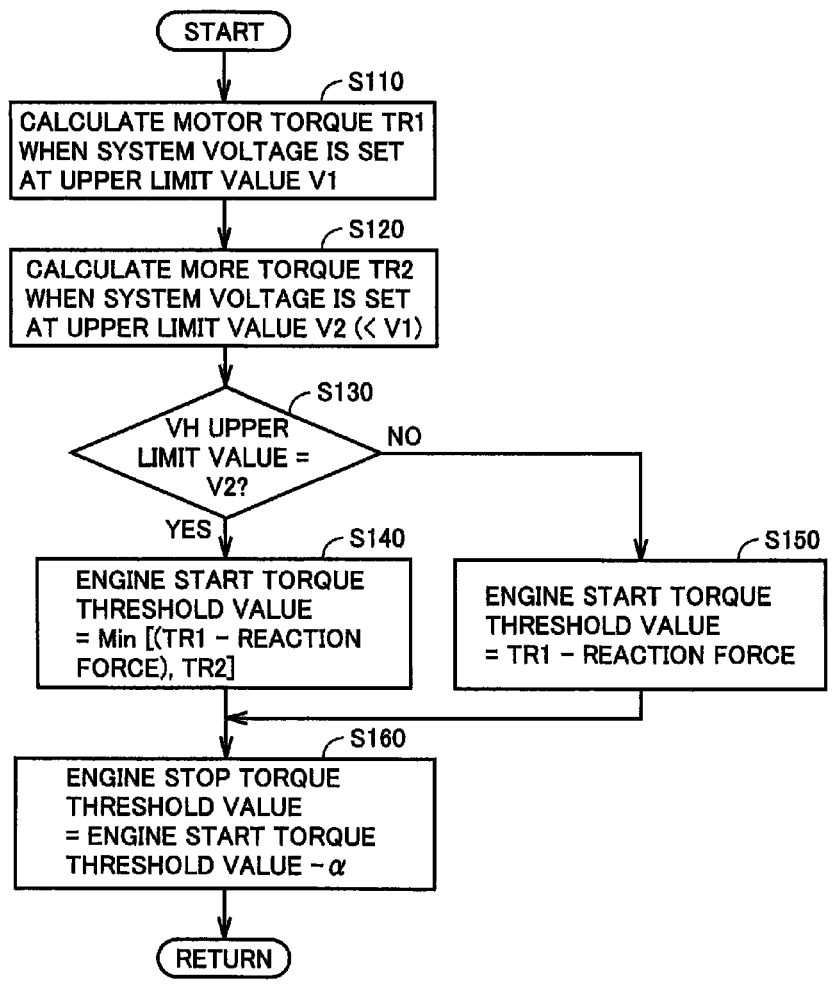
FIG. 14 is a flowchart to describe the procedure related to calculating the torque threshold value for engine start/stop.

FIG. 14 is a flowchart to describe the procedure in calculating the torque threshold value for engine start/stop. Referring to FIG. 14, ECU 15A calculates torque TR1 of motor generator MG2 when system voltage VH is upper limit value V1 (step S110). Then, ECU 15A calculates torque TR2 of motor generator MG2 when system voltage VH is upper limit value V2 (<V1) (step S120).

ECU 15A determines whether VH upper limit value VHUL is set at upper limit value V2 or not (step S130). When a determination is made that VH upper limit value VHUL is upper limit value V2 (YES at step S130), ECU 15A takes the smaller of the value that is a subtraction of the reaction force generated at motor generator MG2 at the time of starting the engine from torque TR1 calculated at step S110 and torque TR2 calculated at step S120 as engine start torque threshold value TRS (step S140). When a determination is made that VH upper limit value VHUL is not upper limit value V2, i.e. VH upper limit value VHUL is upper limit value V1 at step S130 (NO at step S130), ECU 15A takes the value that is a subtraction of the reaction force received at motor generator MG2 at the time of starting the engine from torque TR1 calculated at step S110 as engine start torque threshold value TRS (step S150). The reaction force received at motor generator MG2 at the time of starting the engine is prepared in advance as a map of the temperature of engine ENG, the vehicle speed, and the like.

ECU 15A takes a value that is a subtraction of predetermined hysteresis-corresponding torque α from the engine start torque threshold value calculated at step S140 or S150 as the engine stop torque threshold value (step S160).

In the second embodiment, the smaller of a value that is a subtraction of the reaction force at the time of starting the engine from torque TR1 and torque TR2, when VH upper limit value VHUL is upper limit value V2, is taken as the torque requirement, and the determination of starting engine ENG is made based on the comparison result between the vehicle required torque and the torque requirement. According to the second embodiment, the occurrence of insufficient torque can be prevented, and the reaction force at the time of starting the engine does not have to be taken in account when torque TR2 is employed as the torque requirement. Therefore, EV running can be increased correspondingly.

Although a configuration in which one power storage device 10 and one converter 110 are provided has been described in each of the embodiments, the present invention is also applicable to an electric system in which a plurality of power storage devices and converters are provided (for example, an electric system including a plurality of power storage devices, and a plurality of converters connected parallel thereto).

Furthermore, the embodiments have been described in which external charging is carried out with an external power supply connected to charging inlet 90. External charging may be carried out by a non-contact power feeding method such as by resonance, electromagnetic induction, and the like.

In the foregoing, engine ENG corresponds to an example of "internal combustion engine" of the present invention. Motor generator MG2 corresponds to an example of "electric motor" of the present invention. Inverter 132 corresponds to an example of "driving device" of the present invention. Converter 110 corresponds to an example of "voltage converter" of the present invention. Wout control unit 154 corresponds to an example of "discharge allowable power control unit" of the present invention. Charging inlet 90 and charger 92 constitute an example of "charging device" of the present invention. Furthermore, engine start/stop determination unit 156 corresponds to an example of "determination unit" of the present invention.

It should be understood that the embodiments disclosed herein are illustrative and non-restrictive in every respect. The scope of the present invention is defined by the terms of the claims, rather than the description of the embodiments set forth above, and is intended to include any modifications within the scope and meaning equivalent to the terms of the claims.

REFERENCE SIGNS LIST 10 power storage device; 15, 15A ECU; 17 various sensor outputs; 20 PCU; 30 power output device; 35 accelerator pedal; 40 DG; 50L, 50R front wheel; 60L, 60R rear wheel; 70L, 70R front seat; 80 rear seat; 90 charging inlet; 92 charger; 100 hybrid vehicle; 105, 106 SMR; 110 converter; 120 capacitor; 131, 132 inverter; 140 converter/inverter control unit; 150 SOC calculation unit; 152 running mode control unit; 154 Wout control unit; 156 engine start/stop determination unit; 158, 158A torque requirement calculation unit; 160 VH upper limit control unit; 162 command generation unit; 164 charge control unit; MG1, MG2 motor generator; ENG engine.

The invention claimed is:

1. A control device for a hybrid vehicle,
said hybrid vehicle including
an internal combustion engine and an electric motor generating a vehicle driving force,
a power storage device capable of being charged and discharged,
a drive device driving said electric motor, and
a voltage converter provided between said driving device and said power storage device, configured to allow boosting of an input voltage of said driving device to a level higher than a voltage of said power storage device,
said control device comprising:
a running mode control unit controlling switching of a running mode including a first mode in which said internal combustion engine is stopped and running using said electric motor alone is given priority, and a second mode in which said internal combustion engine is operated and a state of charge indicating a charging state of said power storage device is maintained at a predetermined target; and
a voltage upper limit control unit modifying a voltage upper limit value indicating an upper limit of voltage boosted by said voltage converter based on said running mode and operation/stop of said internal combustion engine, wherein
said voltage upper limit control unit takes a first upper limit value as said voltage upper limit value when said running mode is at said first mode and said internal combustion engine is operating, or when said running mode is at said second mode, and takes a second upper limit value lower than said first upper limit value as said voltage upper limit value when said running mode is at said first mode and said internal combustion engine is stopped; said control device further comprising:
a discharge allowable power control unit increasing, when said running mode is at said first mode and said internal combustion engine is stopped, a discharge allowable power indicating electric power that can be discharged from said power storage device than when said running mode is at said first mode and said internal combustion engine is operating, or than when said running mode is at said second mode.

2. The control device for a hybrid vehicle according to claim 1,
said hybrid vehicle further including a charging device configured to receive supply of electric power from a power supply external to the vehicle to charge said power storage device,
wherein said running mode control unit sets said running mode at said first mode after said power storage device is charged by said charging device.

3. A hybrid vehicle including a control device defined in claim 1.

4. A hybrid vehicle including a control device defined in claim 2.

5. A control device for a hybrid vehicle,
said hybrid vehicle including
an internal combustion engine and an electric motor generating a vehicle driving force,
a power storage device capable of being charged and discharged,
a drive device driving said electric motor, and a voltage converter provided between said driving device and said power storage device, configured to allow boosting of an input voltage of said driving device to a level higher than a voltage of said power storage device, said control device comprising:

a running mode control unit controlling switching of a running mode including a first mode in which said internal combustion engine is stopped and running using said electric motor alone is given priority, and a second mode in which said internal combustion engine is operated and a state of charge indicating a charging state of said power storage device is maintained at a predetermined target; and a voltage upper limit control unit modifying a voltage upper limit value indicating an upper limit of voltage boosted by said voltage converter based on said running mode and operation/stop of said internal combustion engine, wherein said voltage upper limit control unit takes a first upper limit value as said voltage upper limit value when said running mode is at said first mode and said internal combustion engine is operating, or when said running mode is at said second mode, and takes a second upper limit value lower than said first upper limit value as said voltage upper limit value when said running mode is at said first mode and said internal combustion engine is stopped; said control device further comprising:

a torque requirement calculation unit calculating a torque upper limit value indicating an upper limit value of torque output from said electric motor; and a determination unit carrying out a determination of starting said internal combustion engine based on a comparison result between required torque of said hybrid vehicle and said torque upper limit value; and wherein, when said voltage upper limit value is said second upper limit value, said torque requirement calculation unit takes, as said torque upper limit value, a smaller of torque that is a subtraction of reaction force generated at said electric motor at a time of starting said internal combustion engine from torque of said electric motor when the voltage boosted by said voltage converter is said first upper limit value, and the torque of said electric motor when the voltage boosted by said voltage converter is said second upper limit value.

6. A hybrid vehicle including a control device defined in claim 5.

* * * * *